United States Patent [19]
Chung

[11] Patent Number: 5,788,047
[45] Date of Patent: Aug. 4, 1998

[54] COIN COLLECTING MACHINE

[76] Inventor: Johnny Chung, 6F-3, No. 296, Sec. 2, Chung Shan Road, Chung Ho City, Taipei Hsien, Taiwan

[21] Appl. No.: 775,743

[22] Filed: Dec. 31, 1996

[51] Int. Cl.[6] .................................................. H04M 17/02
[52] U.S. Cl. ........................... 194/318; 194/345; 194/346
[58] Field of Search ................................... 194/317, 318, 194/345, 346; 379/146, 150, 151, 152, 153; 221/301

[56] References Cited

U.S. PATENT DOCUMENTS

| | | | |
|---|---|---|---|
| 2,087,903 | 7/1937 | Dohle | 379/152 |
| 4,226,252 | 10/1980 | Lahtinen | 221/301 X |
| 4,899,371 | 2/1990 | Su | 194/345 X |
| 5,483,583 | 1/1996 | Chen | 379/153 X |

*Primary Examiner*—F. J. Bartuska
*Attorney, Agent, or Firm*—Rosenberg, Klein & Bilker

[57] ABSTRACT

A coin collecting machine including a coin sorting device and a sequential coin receiving device. The coin sorting device includes a coin way and coin detecting oscillators disposed on two sides of the coin way for identifying whether the coin is a true one or a false one. The coin sorting device further includes an adjustable shifting member pivotally disposed in a rear section of the coin way for guiding the true coin into a coin receiving passage of the sequential coin receiving device, while guiding the false coin into a coin returning passage thereof. The sequential coin receiving device includes a sequential coin receiving mechanism disposed on outer side of the coin receiving passage for operatively releasing the coins therein into a coin collecting box one by one.

8 Claims, 14 Drawing Sheets

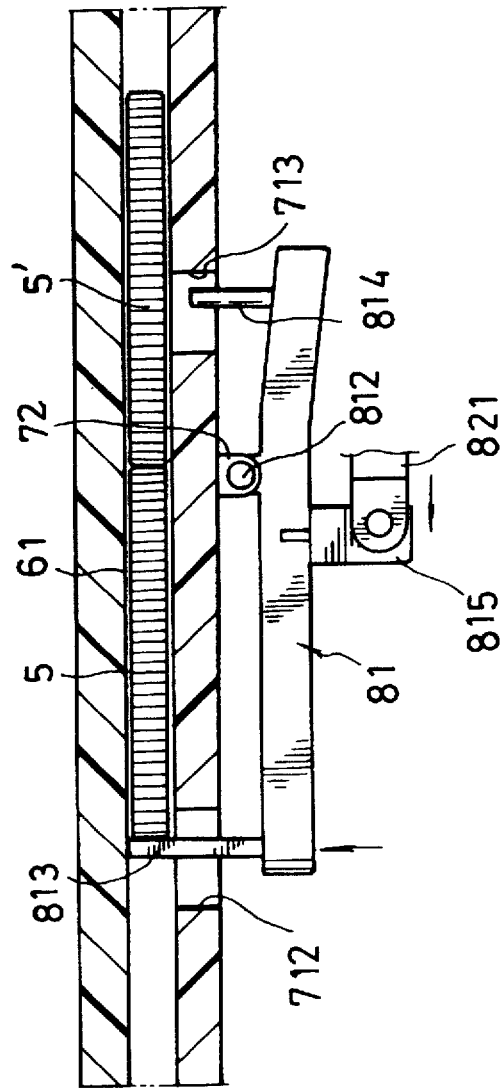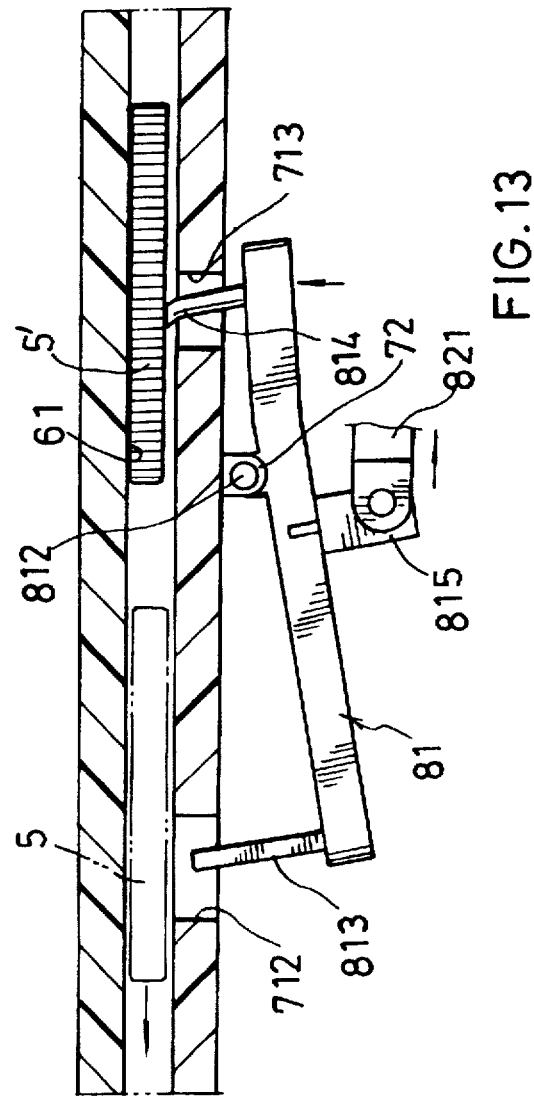

COIN COLLECTING MACHINE

BACKGROUND OF THE INVENTION

The present invention relates to a coin collecting machine including a coin sorting device and a sequential coin receiving device for identifying whether the inserted coins are true ones or false ones and sequentially releasing the true coins into a coin collecting box.

Coin collecting machine is widely used in public telephone, vending machine, etc. FIGS. 1 to 3 show an existing coin collecting machine in which a magnetic valve switch 91 is disposed on outer side of a coin way 9 for operatively controlling a stopper board 92 extending into the coin way 9. As shown in FIGS. 1 and 2, when a true coin is inserted, the magnetic valve switch 91 is energized to totally retrieve the stopper board 92 out of the coin way 9, permitting the true coin to drop into a coin receiving passage 93. However, in case a false coin is inserted, as shown in FIGS. 1 and 3, the magnetic valve switch 91 is not energized and the stopper board 92 still blocks the coin receiving passage 93 and guides the false coin toward a right side coin returning passage 94 to drop onto a coin exit. Accordingly, the stopper board 92 serves to sort out the false coin as a gate. However, when operated, the stopper board 92 must be totally retrieved out of the coin way 9 for dropping the true coin into the coin receiving passage 93. After a long period of use, an abrasion will take place between the stopper board 92 and the magnetic valve arm 911 of the switch 91 or a gap will be formed at the pivot portion of the stopper board 92 to cause swinging thereof, so that the stopper board 92 often fails to be completely withdrawn from the coin way 9 and still partially remains therein. As a result, even when a true coin is inserted, the true coin will still be guided to the coin returning passage 94 to drop onto the coin exit. This leads to great trouble to the user.

In addition, after the coin goes into the coin receiving passage, the coin is stopped by another stopper board 95. When telecommunication is achieved, a triggering signal is generated to open the stopper board 95, whereby the coin in the passage is no longer stopped and is able to further slide down for collection. However, in the case that multiple coins are inserted into the coin receiving passage 93 at one time, these coins will slide downward together without obstacle and tend to jam the coin receiving passage 93. This often makes the coins stuck in the passage and fail to drop down.

Moreover, the conventional coin collecting machine is unable to accurately control the number of the let go coins. Therefore, during opening operation of the stopper board 95, two adjacent coins often together drop down to cause a situation of overpay.

SUMMARY OF THE INVENTION

In order to obviate the above shortcomings existing in the conventional coin collecting machine, it is a primary object of the present invention to provide a coin collecting machine including a coin sorting mechanism pivotally disposed in a coin way for adjustably biasing a shifting member so as to change exit of the coin way, whereby the true coin and false coin are accurately dropped out from different exits into a coin receiving passage and a coin returning passage respectively.

It is a further object of the present invention to provide the above coin collecting machine further including a a sequential coin receiving device for releasing the coins in the coin receiving passage into a coin collecting box one by one so as to avoid jam of the coins or overpay.

The present invention can be best understood through the following description and accompanying drawings, wherein:

BRIEF DESCRIPTION OF THE DRAWINGS

FIG. 12 shows that the coin is not released by the coin receiving member of the present invention;

FIG. 13 is a view according to FIG. 12, in which the coin receiving member is biased to release the first coin;

DETAILED DESCRIPTION OF THE PREFERRED EMBODIMENTS

Figure 1:
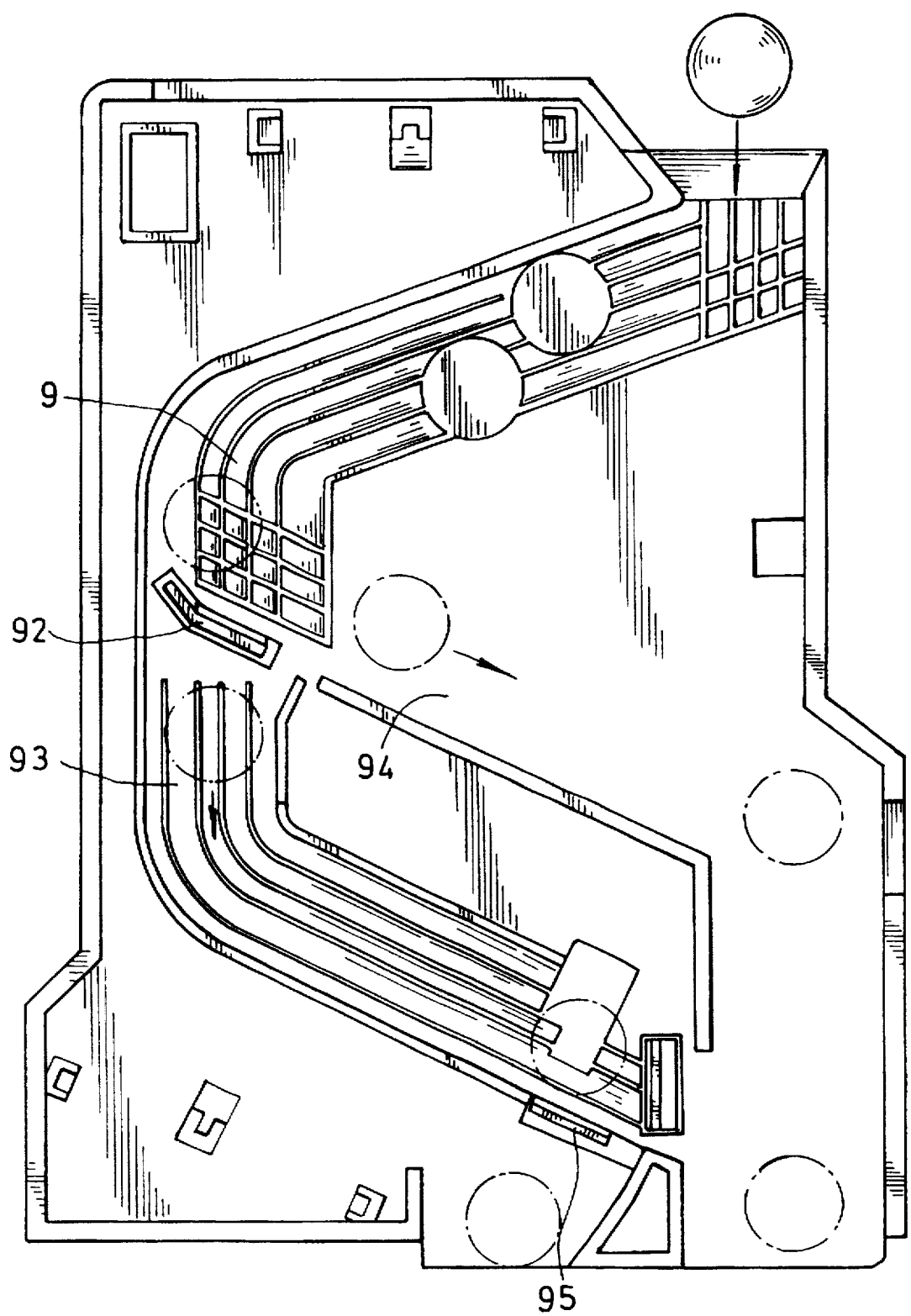
FIG. 1 is a plane view of a conventional coin collecting machine.
Figure 2:
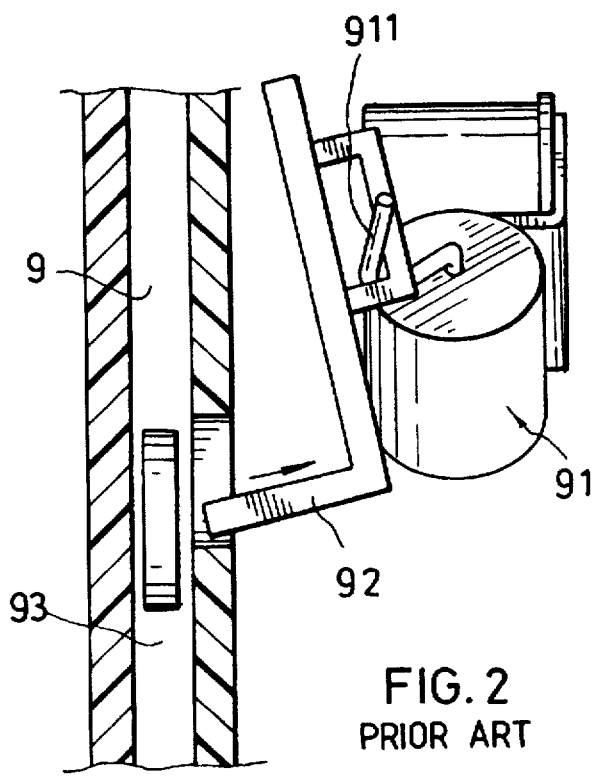
FIG. 2 shows the operation of the conventional coin collecting machine in the case that a true coin is inserted.
Figure 3:
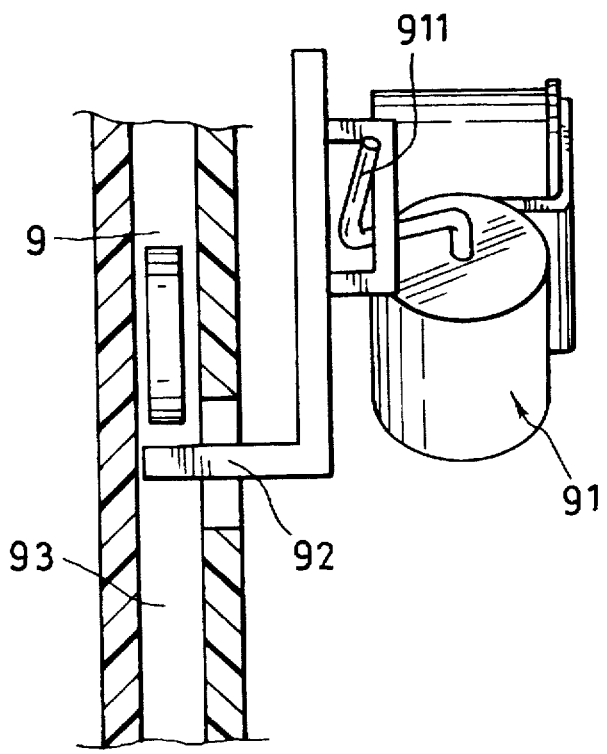
FIG. 3 shows the operation of the conventional coin collecting machine in the case that a false coin is inserted.
Figure 4:
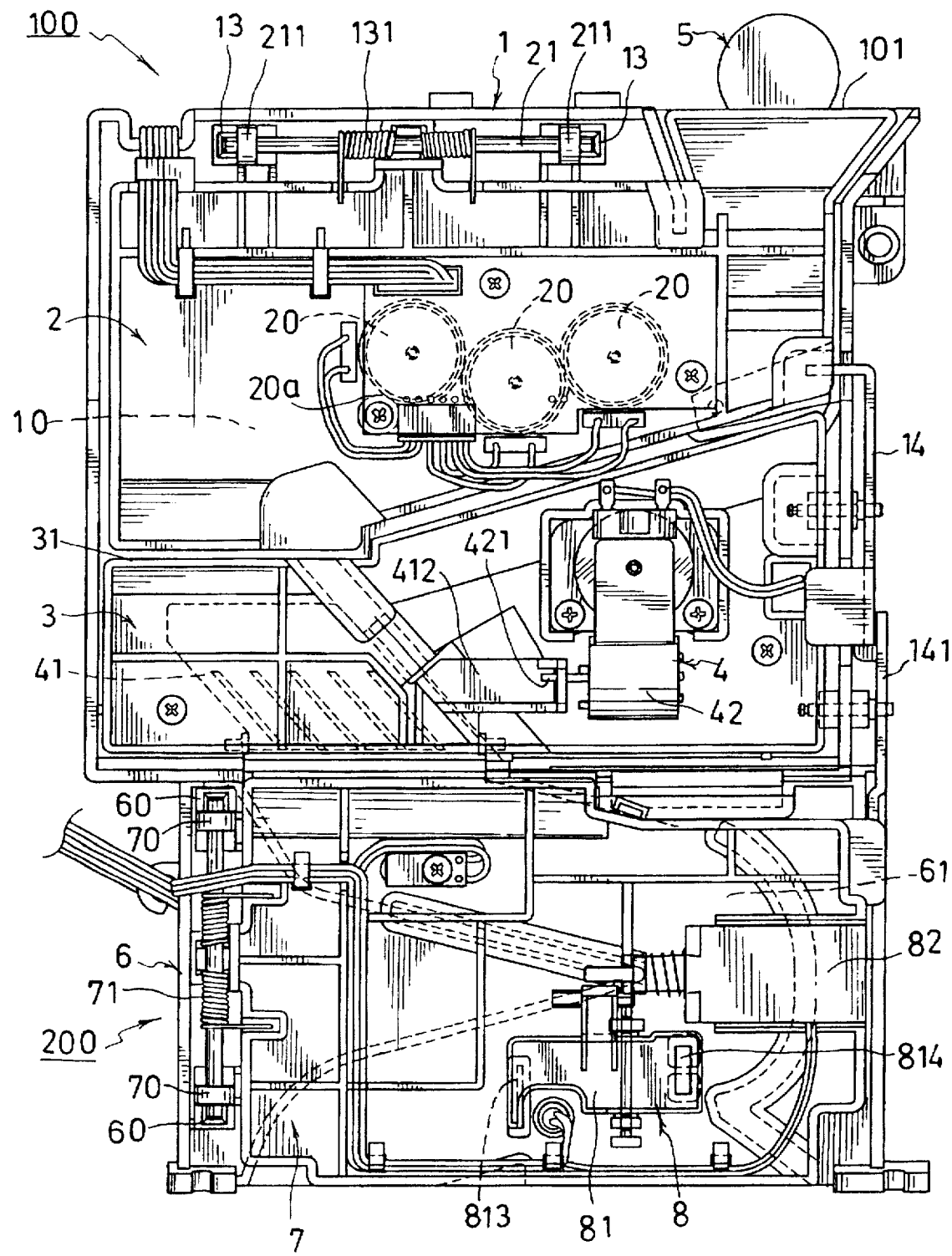
FIG. 4 is a plane view of the coin collecting machine of the present invention.

Please refer to FIG. 4. The coin collecting machine of the present invention includes a coin sorting device 100 and a sequential coin receiving device 200. The coin 5 inserted into the coin sorting device 100 is identified thereby, whereby the true coin is guided to a coin receiving passage 61 of the sequential coin receiving device 200, while the false coin is guided to a coin returning passage 62. A sequential coin receiving mechanism 8 of the sequential coin receiving device 200 serves to operatively collect the coins 5 in the coin receiving passage 61 into a coin collecting box (not shown) one by one.

Referring to FIGS. 4 to 7. The coin sorting device 100 includes a first base board 1, a second base board 2 resiliently pivotally disposed on the first base board 1 and a third base board 3 fixedly disposed on the first base board 1. The first base board 1 and the second and third base boards 2, 3 define a coin way 10 therebetween. An adjustable shifting member 41 of a sorting mechanism 4 is pivotally disposed in bottom end of the coin way 10. By means of biasing the shifting member 41, the coin outgoing direction of the coin way 10 can be adjusted, whereby the true and false coins in the coin way 10 are released respectively from different exits.

The first base board 1 at least includes: a first coin rail 11 protruding from outer side of the main body of the first base board 1. Each lateral side of bottom end of the first coin rail 11 being formed with a pivot seat 12 for pivotally mounting the shifting member 41 thereon; a base board pivot seat 13 protruding from the outer side of the main body for pivotally mounting the second base board 2 thereon, a restoring spring 131 being compressed between the first and second base boards 1, 2, whereby the second base board 2 is normally mated with the first base board 1; and a coin removing lever 14 pivotally disposed at a lateral end of the first base board 1, one end of the coin removing lever 14 being connected with the second base board 2 for operatively outward biasing the second base board 2 and enlarging the distance between the first and second base boards 1, 2 so as to remove any deformed coin 5 jammed in the coin way 10.

The second base board 2 at least includes a pivot shaft 21 passed through two lateral pivot lugs 211 of the second base board 2 and pivotally fitted in the base board pivot seats 13 of the first base board, a restoring spring 131 being fitted around the pivot shaft 21 with a first end 131a hooked on a projecting seat 15 of the first base board and a second end 131b abutting against outer side of the second base board 2, whereby the second base board 2 is normally mated with the first base board 1; and a second coin rail 22 protruding from outer side of the second base board 2, whereby when the second base board 2 is mated with the first base board 1, the first and second coin rails 11, 22 define a front section of the coin way 10 for guiding the coin 5 to slide therethrough, a top end of the coin way 10 being formed with a coin entrance 101.

Multiple pairs of oscillators 20 are respectively and oppositely installed on outer sides of the first and second base boards 1, 2 along the coin way 10. The oscillators 20 are serially connected to form a high or low frequency oscillating circuit 20a which serves as a coin detecting device for analyzing the thickness, material and diameter of the coin 5 passing through the coin way 10 and providing the data for a central processing unit (not shown) to judge whether the coin is a true one or a false one. The central processing unit then generates a signal for biasing the shifting member 41 so as to change the outgoing direction of the coin way 10.

The third base board 3 includes a third coin rail 31 corresponding to a bottom section of the first coin rail 11 and mated therewith to define a bottom section of the coin way 10 and a coin exit 102 at the bottom end of the first coin rail 11. The shifting member 41 is contained in the coin exit 102.

Figure 5:
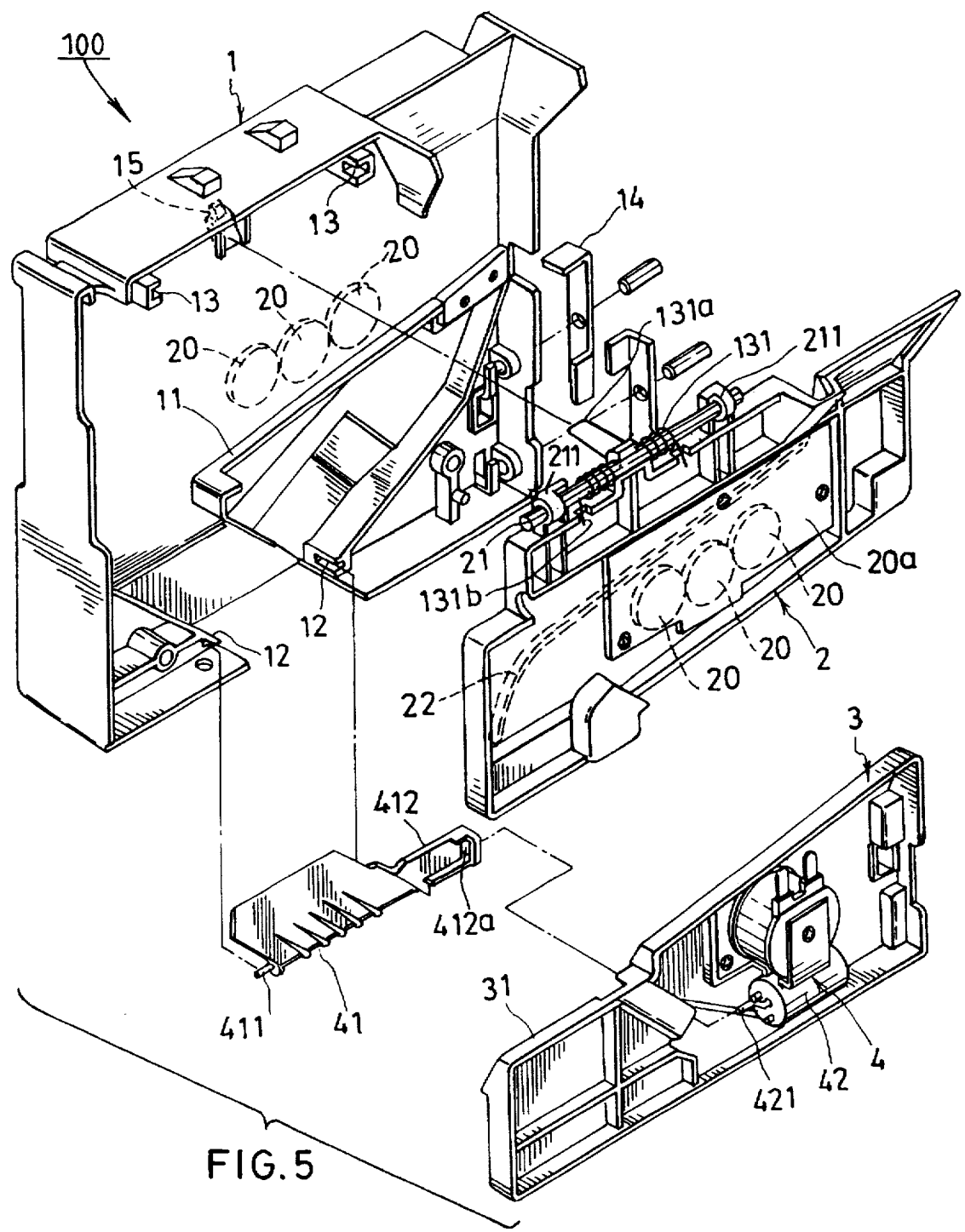
FIG. 5 is a perspective exploded view of the coin sorting device of the present invention.

The sorting mechanism 4 includes: an adjustable shifting member 41, each lateral side of bottom end of the shifting member being disposed with a pivot pin 411 for pivotally fitting into the pivot seats 12 of the first base board, a front edge 410 of the shifting member 41 being pivotable about the pivot pins 411 to lean against a lateral wall of the coin way 10 so as to selectively guide and drop the coin 5 from one of two lateral sides of the shifting member 41. A pushing board 412 projects from the shifting member 41 and is formed with a slot 412a. A driving member 42 is fixed on outer side of the coin sorting device 100 (fixed on outer side of the third base board 3 as shown in FIG. 5) for rotarily driving a pushing lever 421. The pushing lever 421 is passed through the slot 412a, whereby when the pushing lever 421 is rotated, the front edge 410 of the shifting member 41 is driven and biased to abut against a first lateral wall 10a or a second lateral wall 10b of the coin way 10.

Figure 6:
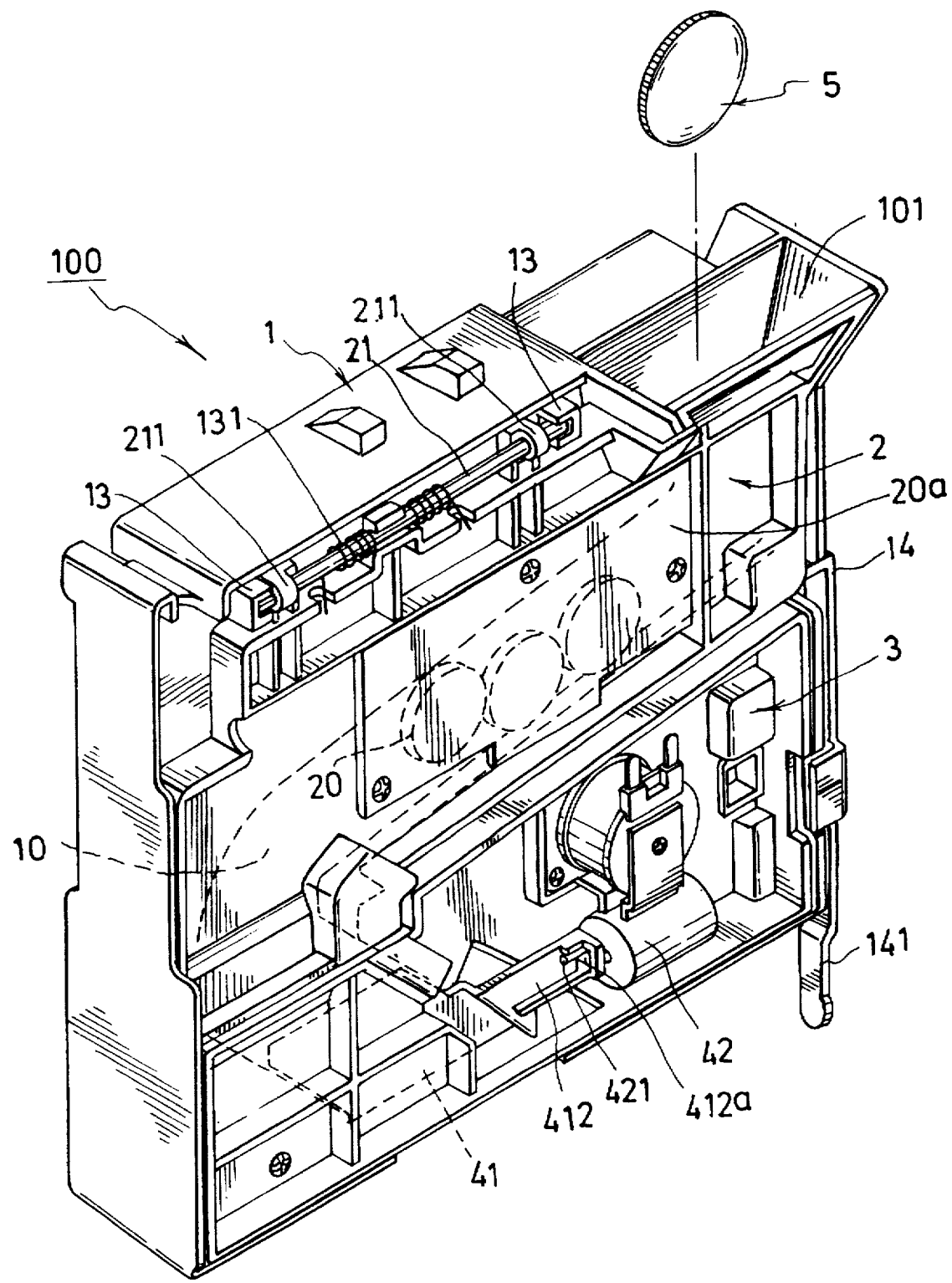
FIG. 6 is a perspective assembled view of the coin sorting device of the present invention.
Figure 7:
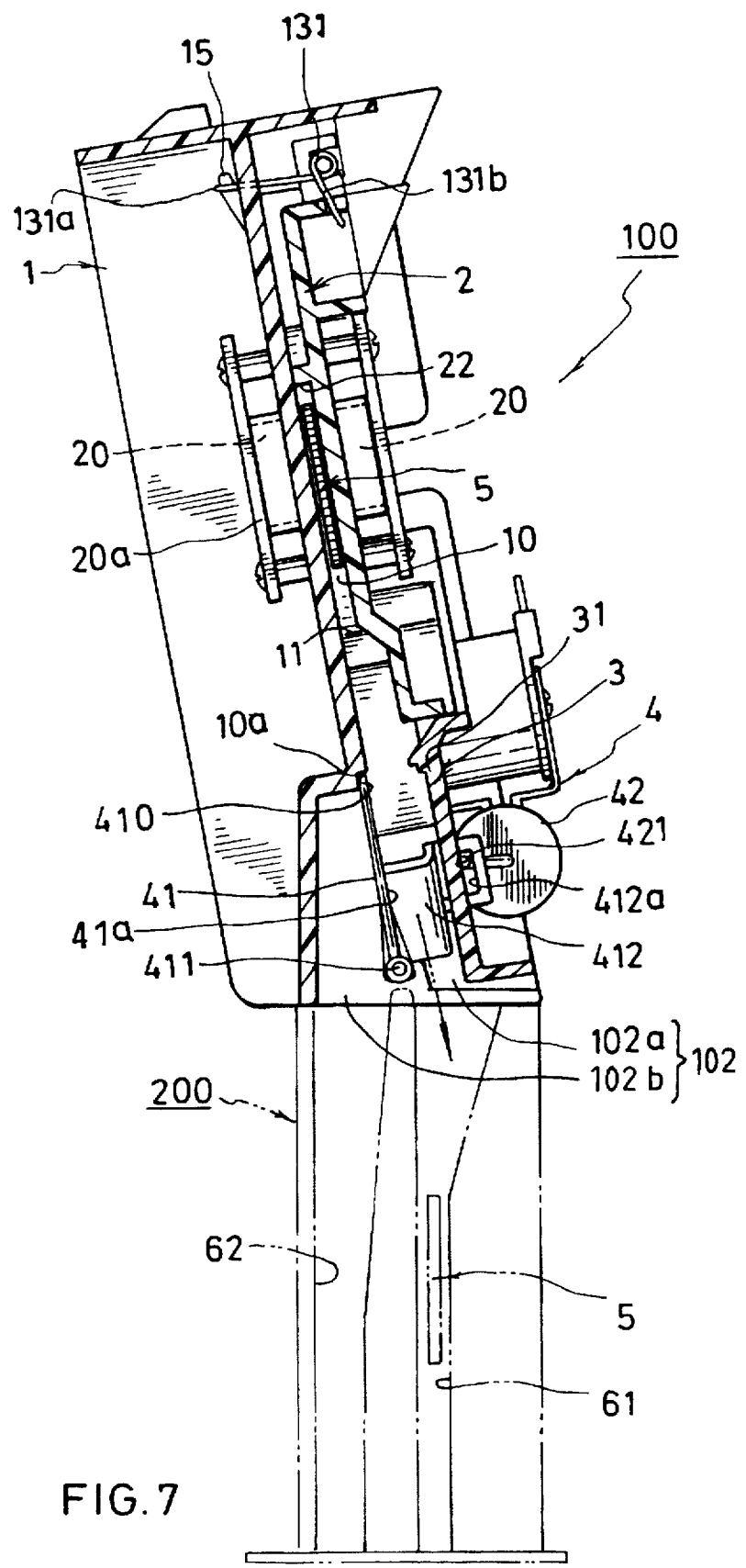
FIG. 7 shows the operation of the coin sorting device of the present invention in the case that a true coin is inserted.

As shown in FIGS. 6 and 7, when a coin 5 is inserted into the coin entrance 101 of the coin way 10, the coin 5 will slide down along the coin way 10 and pass through the oscillators 20. In the case that the oscillators 20 judge that the coin is a true one, a signal is generated to trigger the driving member 42 of the sorting mechanism 4 for rotating the pushing lever 421. At this time, the front edge 410 of the shifting member 41 is driven to abut against the first lateral wall 10a of the coin way 10, permitting the coin 5 to slide outward along a first face 41a of the shifting member 41 and drop into a coin receiving passage 61 of the sequential coin receiving device 200 from a first lateral exit 102a of the coin exit 102.

Figure 8:
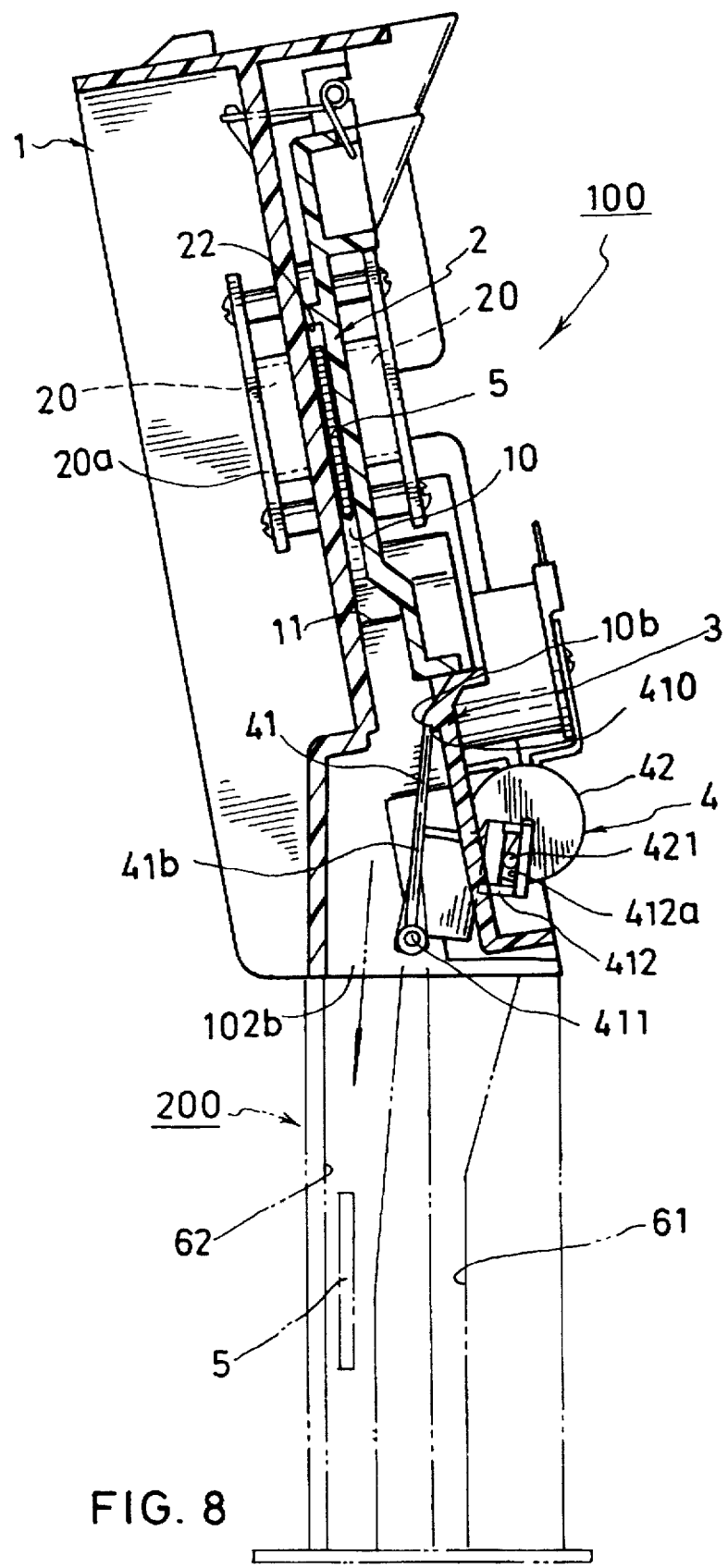
FIG. 8 shows the operation of the coin sorting device of the present invention in the case that a false coin is inserted.

Referring to FIG. 8, in the case that the oscillators 20 judge that the coin 5 is a false one, a signal is generated to trigger the driving member 42 of the sorting mechanism 4 for rotating the pushing lever 421. At this time, the front edge 410 of the shifting member 41 is driven to abut against the second lateral wall 10b of the coin way 10, making the false coin slide down outward along a second face 41b of the shifting member 41 and drop into a coin returning passage 62 of the sequential coin receiving device 200 from a second lateral exit 102b of the coin exit 102.

The driving member 42 of the sorting mechanism 4 can be a magnetic valve switch or other types of driving means capable of driving the pushing lever 421.

Figure 9:
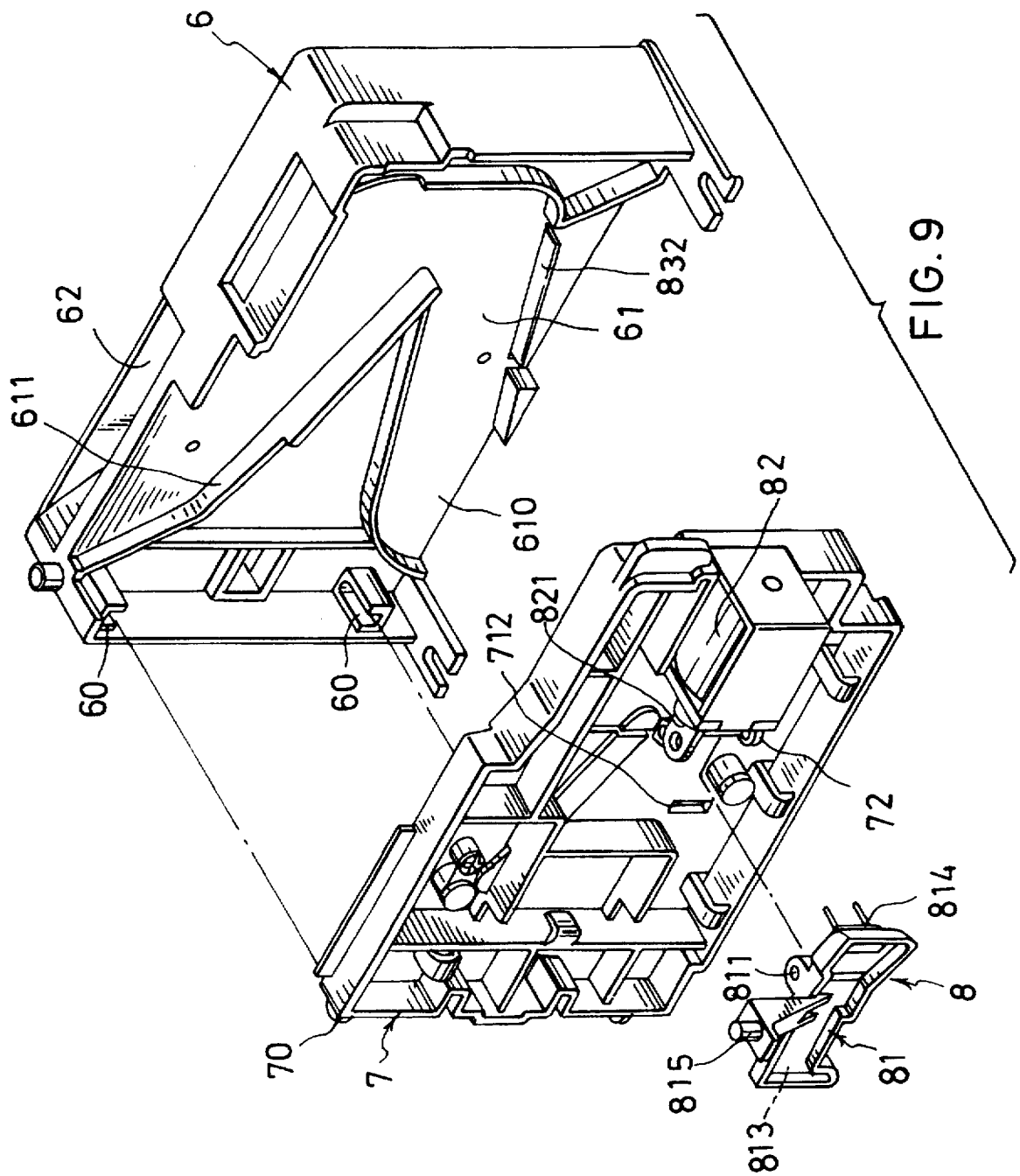
FIG. 9 is a perspective exploded view of the sequential coin receiving device of the present invention.
Figure 10:
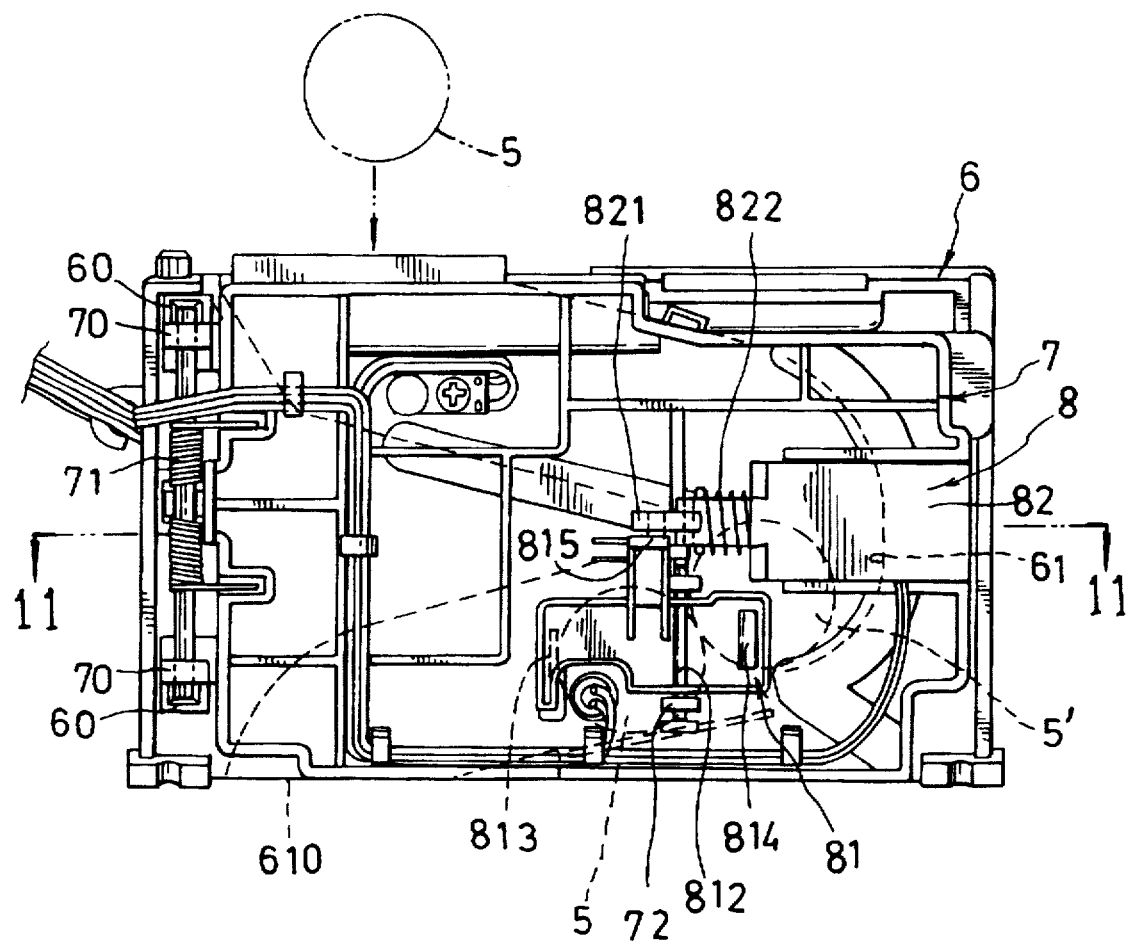
FIG. 10 is a plane view of the sequential coin receiving device in which the coin is not let go.
Figure 11:
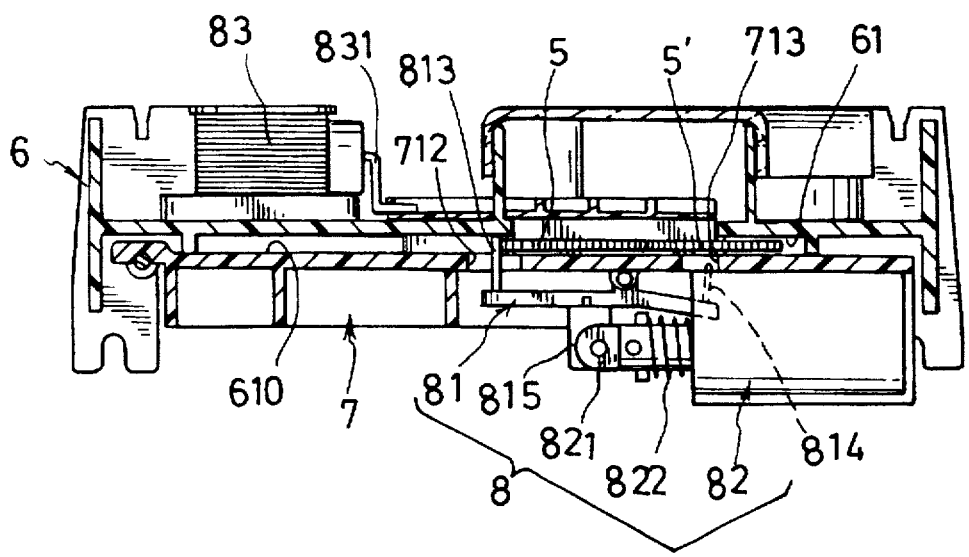
FIG. 11 is a sectional view taken along line 11—11 of FIG. 10.

Please refer to FIGS. 9 and 10. The sequential coin receiving device 200 is disposed under the coin sorting device 100, including: a base seat 6, a coin slide rail 611 projecting from one side of the base seat 6, the other side of the base seat 6 being formed with a coin returning passage 62; an outer base board 7 having a pivot end 70 for resiliently pivotally fitting in a pivot seat 60 on outer side of the base seat 6, the outer base board 7 normally covering the outer side of the coin slide rail 611 of the base seat 6 via a spring 71 to form a coin receiving passage 61; and a sequential coin receiving mechanism 8 installed on outer side of the coin receiving passage 61 and having a coin receiving member 81 for operatively releasing the coins 5 in the coin receiving passage 61 one by one.

The sequential coin receiving mechanism 8 includes a coin receiving member 81 and a controlling magnetic valve 82. The coin receiving member 81 is formed with a shaft hole 811. A pivot pin 812 is passed through the shaft hole 811 for pivotally mounting the coin receiving member 81 on a pivot seat 72 on outer side of the outer base board 7, whereby the coin receiving member 81 can be rotated about the pivot pin 812. A stopper arm 813 projects from the first end of the coin receiving member 81 to the outer base board 7 in alignment with a through hole 712 of outer wall of the coin receiving passage 61, whereby by means of rotating the coin receiving member 81, the stopper arm 813 can extend into the coin receiving passage 61 for stopping the coin 5 therein from sliding and dropping outward. An abutting member 814 projects from the second end of the coin receiving member 81 to the outer base board 7 in alignment with a guiding hole 713 of outer wall of the coin receiving passage 61, whereby by means of rotating the coin receiving member 81, the abutting member 814 can extend through the guiding hole 713 into the coin receiving passage 61 for stably retaining a coin 5' in alignment with the abutting member 814 and stopping the coin 5' from sliding and dropping down. A coupling seat 815 projects from the end face of the coin receiving member 81 for coupling with the valve stem 821 of the controlling magnetic valve 82. Accordingly, the valve stem 821 is reciprocally operated to drivingly bias the coin receiving member 81. A stopper plate 832 is pivotally disposed outside the coin receiving passage 61. The stopper plate 832 normally extends into the coin receiving passage 61 for blocking a coin returning opening 630 between two ends of the coin receiving member 81. A pushing lever 831 of a coin returning controlling unit 83 fixed on the sequential coin receiving device 200 operatively outward pushes the stopper plate 832 out of the coin receiving passage 61 so as to release the coin 5 remaining in the coin receiving passage 61 from the coin returning opening 630.

The abutting member 814 of the second end of the coin receiving member 81 is made of soft material such as rubber for inserting in the second end thereof. However, the material and pattern of the abutting member 814 are not limited.

The controlling magnetic valve 82 includes a valve stem 821 slidably disposed therein. A restoring spring 822 is compressed between the valve stem 821 and the main body of the controlling magnetic valve 82. In the case that the controlling magnetic valve 82 is not energized, the restoring spring 822 outward pushes the valve stem 821 for driving the stopper arm 813 of the first end of the coin receiving member 81 to extend into the coin receiving passage 61. When the sequential coin receiving device 200 transmits a coin receiving signal to energize the controlling magnetic valve 82, the valve stem 821 is magnetically attracted and retracted to drive the abutting member 814 to extend into the coin receiving passage 61 and retain the secondary coin 5' therein.

Figure 14:
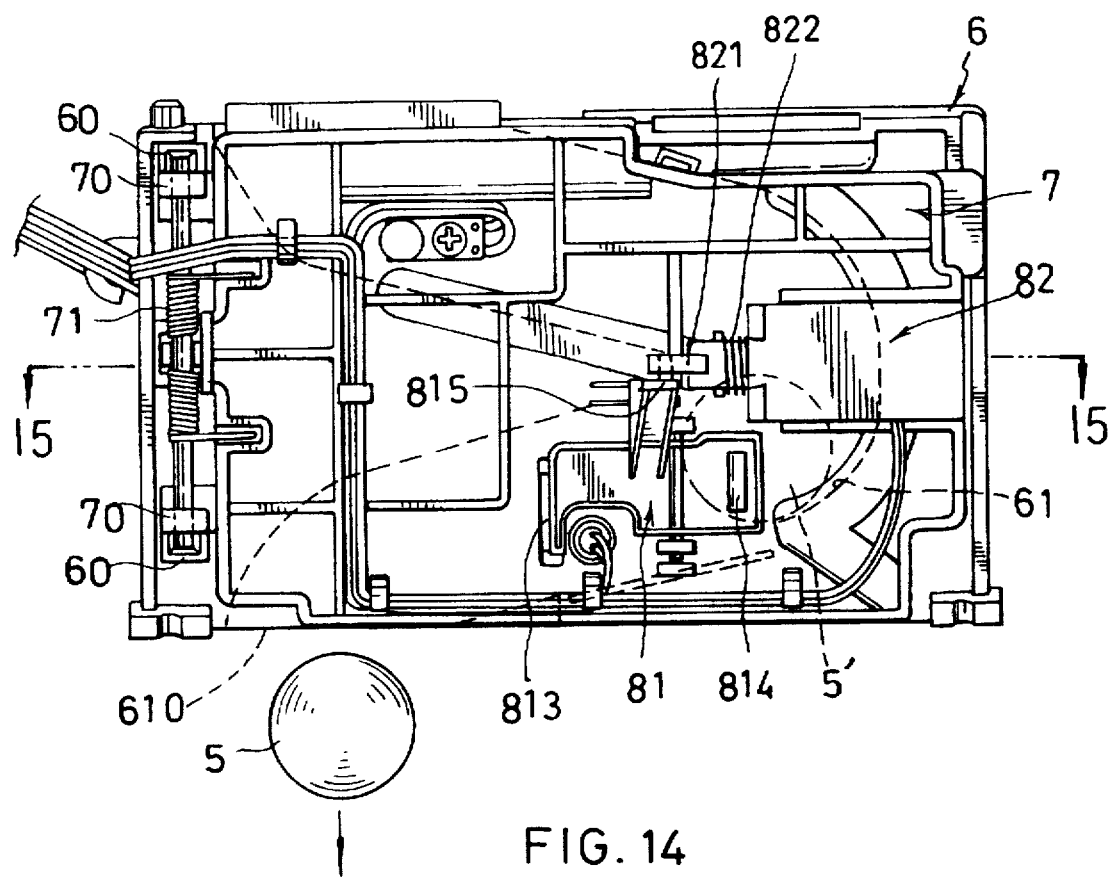
FIG. 14 is a front view of the sequential coin receiving device, in which the first coin is released.
Figure 15:
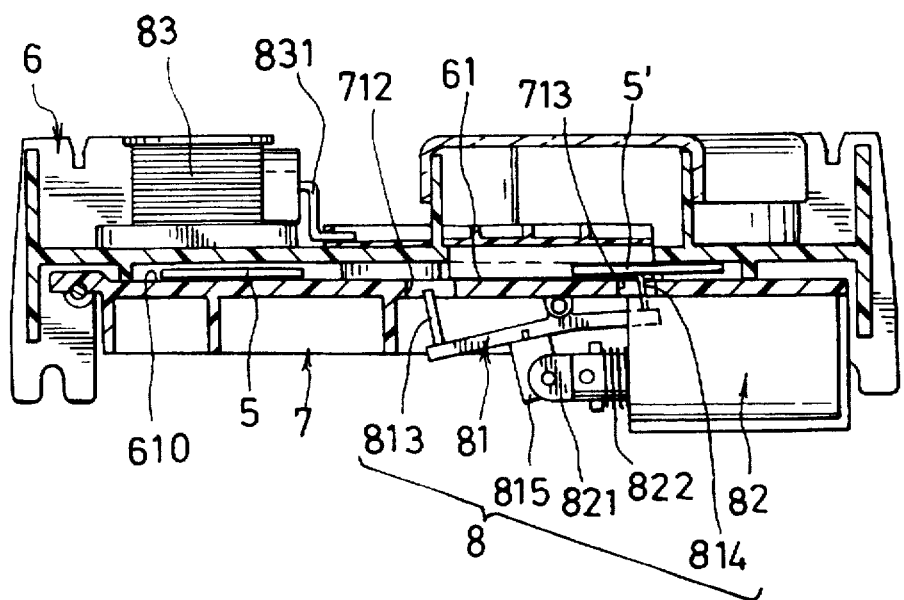
FIG. 15 is a partially sectional view taken along line 15—15 of FIG. 14.
Figure 16:
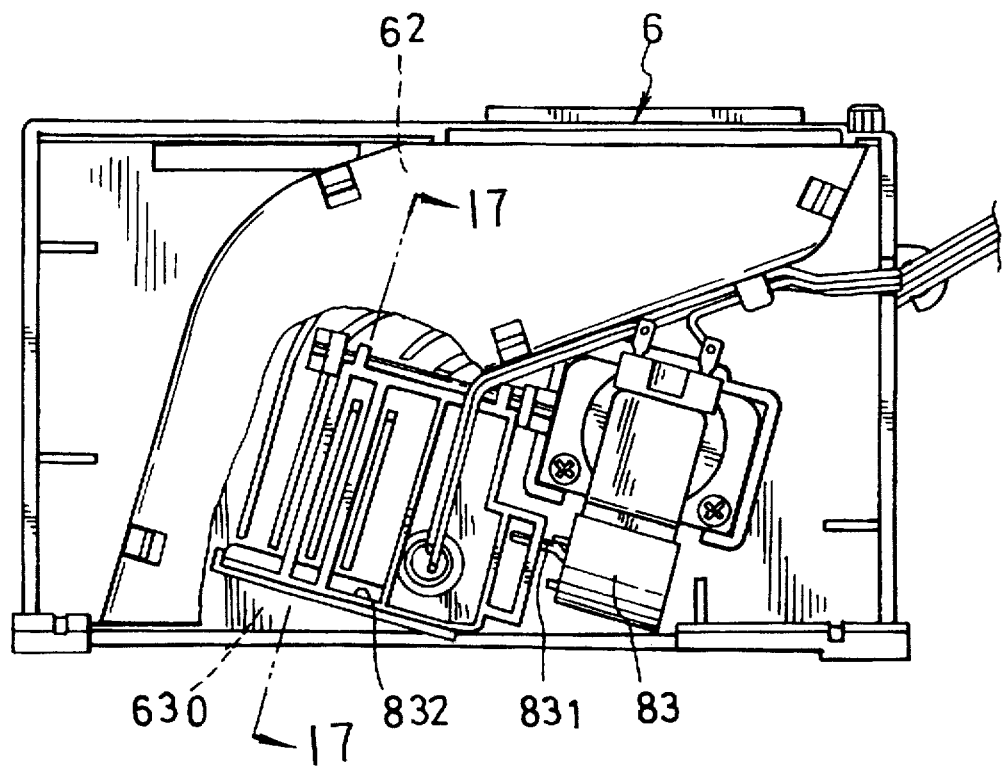
FIG. 16 is a rear view of the sequential coin receiving device.
Figure 17:
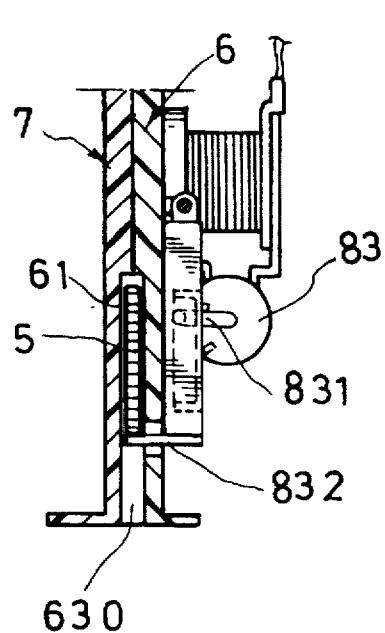
FIG. 17 is a sectional view taken along line 17—17 of FIG. 16.
Figure 18:
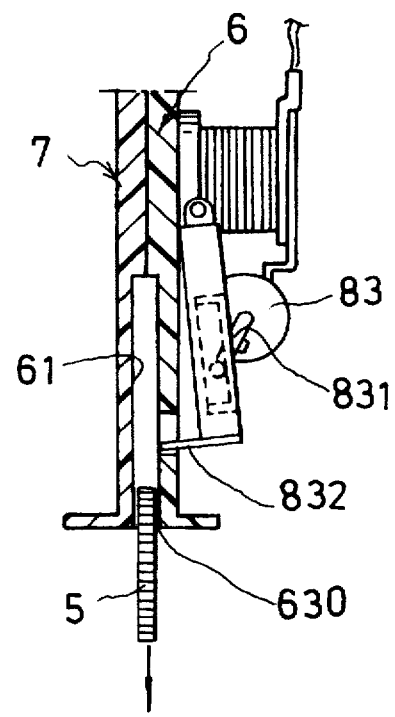
FIG. 18 is a view according to FIG. 17, in which the coin returning controlling unit is energized.
Figure 19:
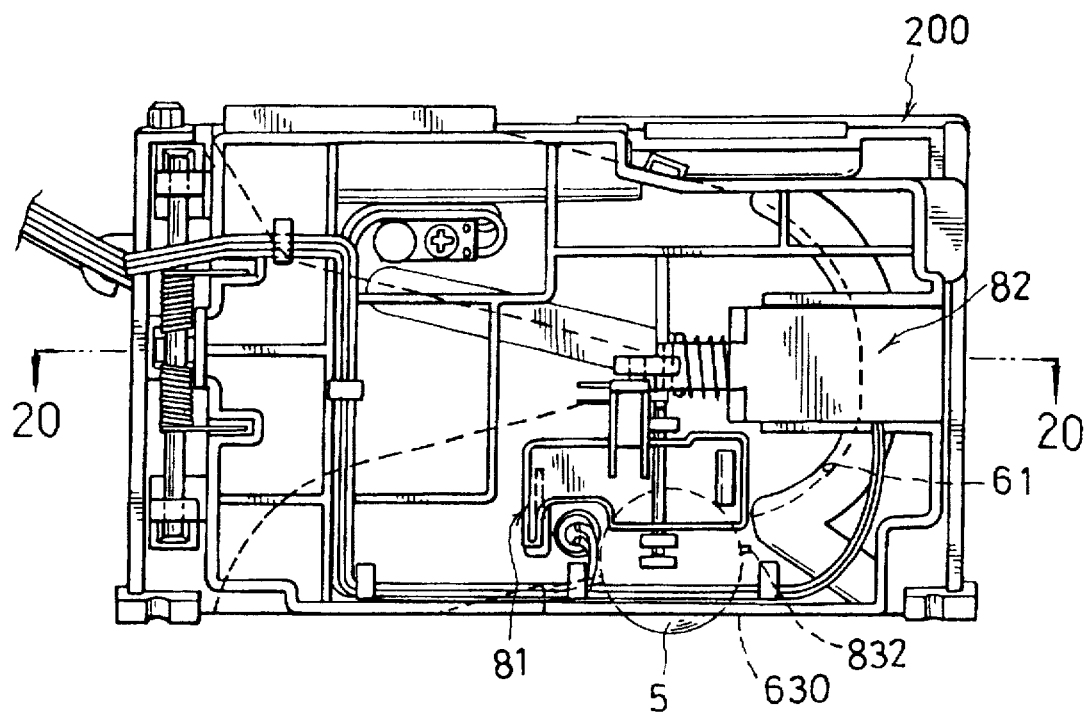
FIG. 19 is a plane view of the present invention in a coin returning state.
Figure 20:
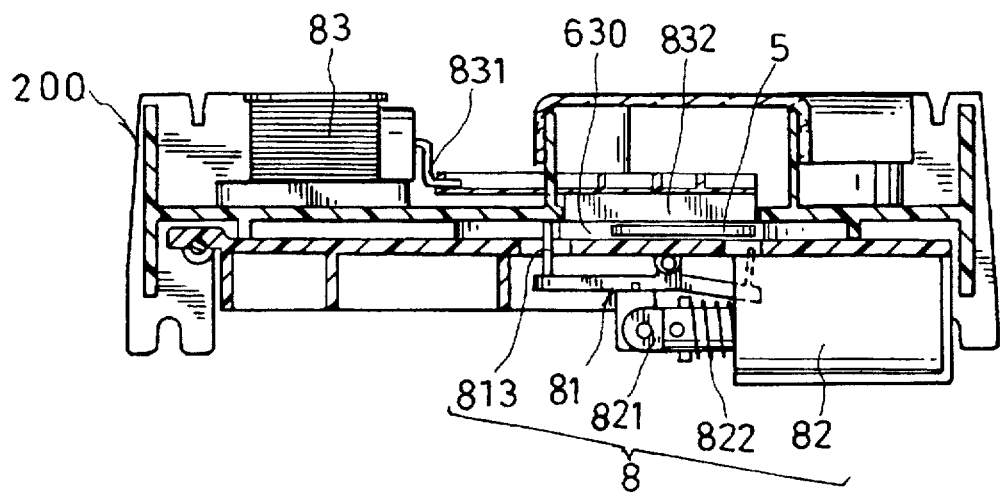
FIG. 20 is a partially sectional view taken along line 20—20 of FIG. 19.

Referring to FIGS. 4, 10, 11 and 12, when multiple coins are inserted into the coin collecting machine and passed through the coin detecting device into the coin receiving passage 61, in the case that the coin receiving signal is not yet generated to the controlling magnetic valve 82, the stopper arm 813 of the first end of the coin receiving member 81 is driven by the valve stem 821 to extend and stay in the coin receiving passage 61 for stopping the coins from further dropping down. As shown in FIGS. 13 to 15, when the appliance on which the coin collecting machine is installed, such as a telephone, is connected and it is necessary to receive the coin as charge, a coin receiving signal is generated to trigger the controlling magnetic valve 82 and retract the valve stem 821. At this time, the coin receiving member 81 is driven and biased, whereby the abutting member 814 of the second end thereof extends into the coin receiving passage 61 to stably retain the secondary coin 5' therein. Simultaneously, the stopper arm 813 of the first end of the coin receiving member 81 is retrieved out of the coin receiving passage 61, permitting the first coin 5 therein to smoothly drop into a coin collecting box (not shown) from the exit 610 of the passage 61 without being stopped by the stopper arm 813. After the coin receiving operation is completed, the controlling magnetic valve 82 is disenergized and the valve stem 821 again extends out, making the stopper arm 813 again extend into the coin receiving passage 61 to release the secondary coin 5' originally retained by the abutting member 814. Therefore, the coin 5' is moved downward and stopped by the stopper arm 813, becoming the first coin 5 in the coin receiving passage 61 waiting for the next coin receiving operation.

As shown in FIGS. 16 to 20, in the case that some coins remain in the coin receiving passage 61 after the user completes the communication, the user can hang up the phone or depress a coin returning button (not shown) to trigger a coin returning controlling unit 83 for driving a pushing lever 831 so as to outward deflect the stopper plate 832 from the coin receiving passage 61. Accordingly, the coin returning opening 630 is no more blocked, permitting the remaining coins 5 to be released from the coin returning opening 630.

The first base board 1 of the coin sorting device 100 and the base seat 6 of the sequential coin receiving device 200 can be combined as an integral unit.

Figure 21:
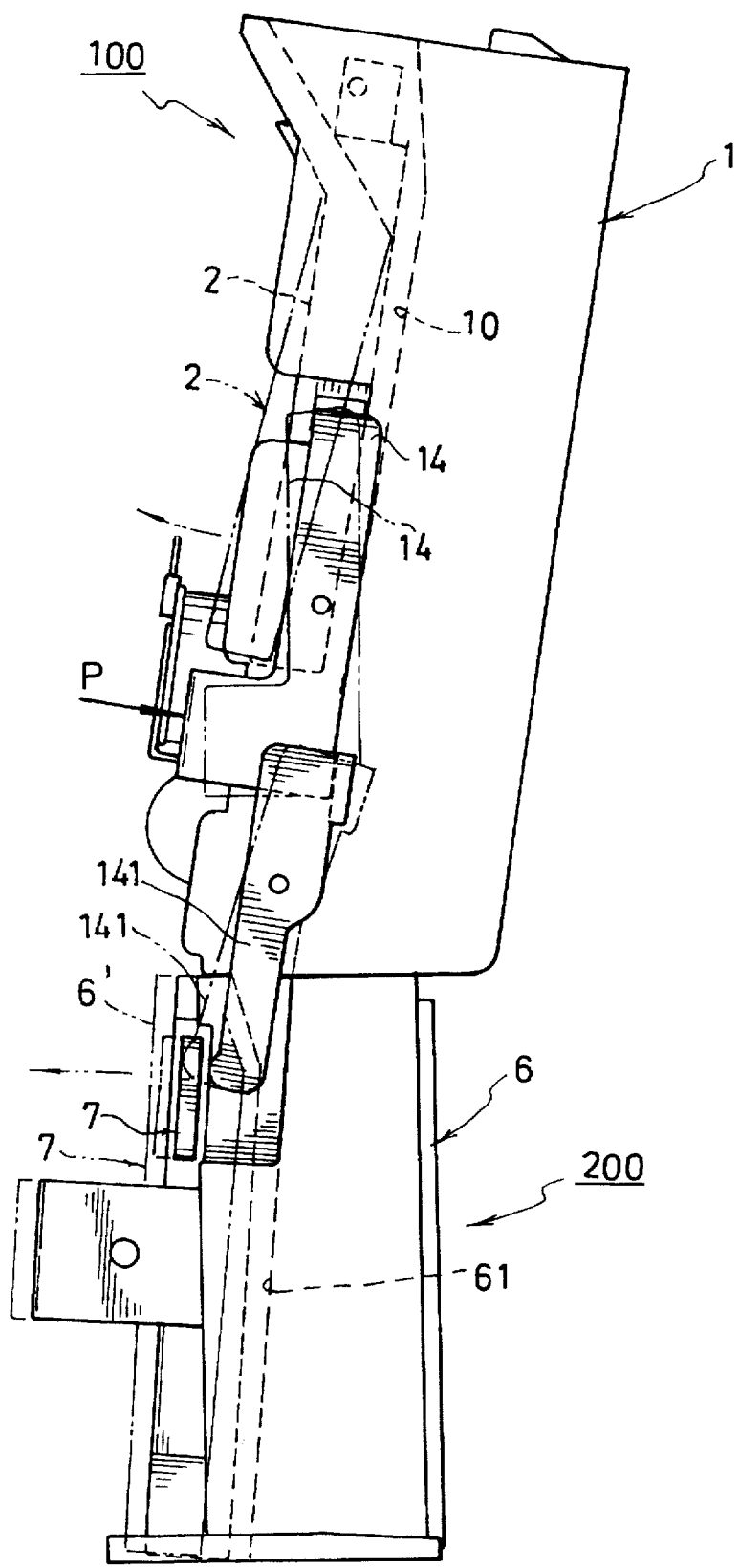
FIG. 21 shows the coin removing operation of the present invention.

Referring to FIG. 21, in the case that the user inserts a deformed coin 5 into the coin collecting machine and during the sliding procedure, the coin 5 is jammed in the coin way 10 between the first and second base boards 1, 2 or in the coin receiving passage 61 of the sequential coin receiving device 200, by means of depressing a push button on outer side of, for example, a telephone (not shown), a coin removing lever 14 pivotally disposed on outer side of the first base board 1 is biased in direction P, whereby the front end of the coin removing lever 14 drivingly biases the second base board 2 outward and enlarges the distance between the first and second base boards 1, 2, making the deformed coin 5 smoothly drop into the coin returning opening. In addition, a second coin removing lever 141 can be further pivotally disposed on the outer side of the coin collecting machine. One end of the second coin removing lever 141 is coupled with the rear end of the coin removing lever 14, whereby when the coin removing lever 14 is biased, the distal end of the second coin removing lever 141 drivingly outward deflects the outer base board 7 of the coin receiving device 200 for enlarging the dimension of the coin receiving passage 61 so as to smoothly remove the coin jammed therein. According to the above arrangement, the user can depress the coin returning button on outer side of the telephone for removing the jammed coin without loss of money. Moreover, when maintaining or repairing the telephone, it is unnecessary to detach the casing of the telephone.

The adjustable shifting member 41 is pivotally disposed in the coin way of the coin collecting machine. By means of biasing the shifting member 41, a true coin and a false coin are respectively guided to drop out from two coin exits on two sides of the shifting member 41. The true coin drops into the coin receiving passage, while the false coin drops into the coin returning opening. The shifting member 41 is biased to guide the coins 5 to drop in different directions in such a manner that the front edge 410 of the shifting member 41 is driven to abut against or get close to the lateral wall of the coin way 10 (with a gap less than the thickness of the coin) so as to properly guide the coins 5 toward different coin exits. Therefore, even though a certain gap or abrasion may exist in the present invention, the path of the coin in the coin way 10 can be still accurately controlled so as to effectively sort the true coin from the false one. This is advantageous over the gate structure of the conventional sorting device.

By means of biasing the coin receiving member of the sequential coin receiving device, the coins in the coin receiving passage are released one by one, whereby the coins can smoothly slide outward and drop into the coin collecting box. This operation has the following advantages:

1. When releasing the respective coins in the coin receiving passage, the abutting member of the second end of the coin receiving member stably retains the secondary coin and only the first coin is released. Accordingly, the coins in the coin receiving passage are released and dropped into the coin collecting box in sequence. Therefore, the coins are prevented from being jammed in the coin receiving passage and the coin collecting operation can be smoothly accomplished.

2. The coins are released one by one so that the situation of overpay is avoided during the coin collecting operation.

It should be noted that the above description and accompanying drawings are only used to illustrate some embodiments of the present invention, not intended to limit the scope thereof. Any modification of the embodiments should fall within the scope of the present invention.

What is claimed is:

1. A coin collecting machine comprising:

a coin sorting device including a first base board, a second base board resiliently pivotally disposed on an outer side of the first base board and a third base board fixedly disposed on the outer side of the first base board, the first base board and the second and third base boards defining a coin way therebetween, multiple sets of oscillators being respectively and oppositely installed on two sides of a front section of the coin way for identifying whether the coin is a true one or a false one, the coin sorting device further including a sorting mechanism including an adjustable shifting member pivotally disposed in a rear section of the coin way, a driving member being fixed on an outer side of the coin sorting device for operatively biasing the shifting member and making a front edge of the shifting member lean against a first lateral wall or a second lateral wall of the coin way so as to change the exit of the coin way; and a sequential coin receiving device disposed at the bottom end of the coin sorting device, including a base seat, a coin slide rail projecting from one side of the base seat, a coin returning passage formed on the other side of the base seat, and an outer base board having one end resiliently pivotally connected to an outer side of the base seat for normally covering the outer side of the coin slide rail of the base seat to form a coin receiving passage, the coin returning passage and the coin receiving passage being respectively aligned with the lower sides of the exits of the coin way of the coin sorting device, the sequential coin receiving device further including a sequential coin receiving mechanism having a coin receiving member pivotally disposed on an outer side of the coin returning passage, the coin receiving member being operatively biased by a controlling magnetic valve, a stopper arm projecting from a first end of the coin receiving member and an abutting member projecting from a second end of the coin receiving member for respectively operatively extending into the coin receiving passage to release the coins therein one by one.

2. A coin collecting machine as claimed in claim 1, wherein the sorting mechanism includes a driving member fixed on an outer side of the third base board for rotarily driving a pushing lever, each lateral side of bottom end of the shifting member being disposed with a pivot pin for pivotally fitting into pivot seats an the first base board, a pushing board projecting from the shifting member and being formed with a slot for slidably fitting the pushing lever of the driving member therein.

3. A coin collecting machine as claimed in claim 1, wherein a coin removing lever is pivotally disposed on the outer side of the first base board of the coin sorting device, by means of depressing a coin returning button, the coin removing lever being pushed and biased, one end of the coin removing lever being connected with the second base board for operatively outward biasing the second base board, a second coin removing lever being further pivotally disposed on the outer side of the first base board, one end of the second coin removing lever being coupled with and drivingly biased by a rear end of the coin removing lever, a distal end of the second coin removing lever being connected with the outer base board of the sequential coin receiving device for operatively outward biasing the outer base board.

4. A coin collecting machine as claimed in claim 1, wherein the coin receiving member is formed with a shaft hole, a pivot pin being passed through the shaft hole for pivotally mounting the coin receiving member on a pivot seat on an outer side of the outer base board, whereby the stopper arm extends through a through hole of the outer wall of the coin receiving passage into the coin receiving passage and the abutting member extends through a guiding hole of the outer wall of the coin receiving passage into the coin receiving passage, a coupling seat projecting from the coin receiving member for pivotally connecting with the valve stem of the controlling magnetic valve.

5. A coin collecting machine as claimed in claim 1, wherein the abutting member of the coin receiving member is made of soft material for inserting in the second end thereof.

6. A coin collecting machine as claimed in claim 4, wherein a restoring spring is compressed between the valve stem and main body of the controlling magnetic valve, at normal time, the restoring spring outward pushing the valve stem for driving the stopper arm of the first end of the coin receiving member to extend into the coin receiving passage.

7. A coin collecting machine as claimed in claim 1, wherein the first base board of the coin sorting device and the base seat of the sequential coin receiving device are combined as an integral unit.

8. A coin collecting machine as claimed in claim 1, wherein a stopper plate is pivotally disposed outside the coin receiving passage, the stopper plate normally extending into the coin receiving passage for blocking a coin returning opening between two ends of the coin receiving member, a pushing lever of a coin returning controlling unit fixed on the sequential coin receiving device operatively outward pushing the stopper plate out of the coin receiving passage.

* * * * *